United States Patent [19]

Bremer

[11] 3,750,471
[45] Aug. 7, 1973

[54] BIFURCATED THERMOMETER PROBE

[76] Inventor: Norman C. Bremer, 608 E. Seneca St., Ithaca, N.Y. 14850

[22] Filed: Mar. 4, 1971

[21] Appl. No.: 120,825

[52] U.S. Cl................. 73/342, 73/340, 73/362 AR, 128/2 H, 338/28
[51] Int. Cl........................... G01k 7/24, H01c 7/04
[58] Field of Search............... 73/340, 342, 362 AR; 338/28; 128/2 H

[56] References Cited
UNITED STATES PATENTS

| | | | |
|---|---|---|---|
| 2,900,820 | 8/1959 | Serafin................................... | 73/342 |
| 3,530,718 | 9/1970 | Ehlo................................ | 73/362 AR |
| 2,870,636 | 1/1959 | Serafin................................... | 73/371 |
| 3,520,187 | 7/1970 | Petersen............................... | 73/342 |
| 3,699,813 | 10/1972 | Lamb................................... | 73/342 |
| 3,377,862 | 4/1968 | Gheorghiu...................... | 73/362 AR |

*Primary Examiner*—Richard C. Queisser
*Assistant Examiner*—Frederick Shoon
*Attorney*—Stoll & Stoll

[57] ABSTRACT

For use in connection with oral clinical thermometers and average reading industrial thermometers, a plurality of branches on a single probe connected to yield a temperature reading which is the average of the temperatures sensed at each branch. For oral use, the spaced distance between two branches is substantially the same as the distance between the pockets on opposite sides of the fraenum of the tongue to prevent lateral movement of the probe and resulting erroneous temperature measurement.

5 Claims, 4 Drawing Figures

PATENTED AUG 7 1973 3,750,471
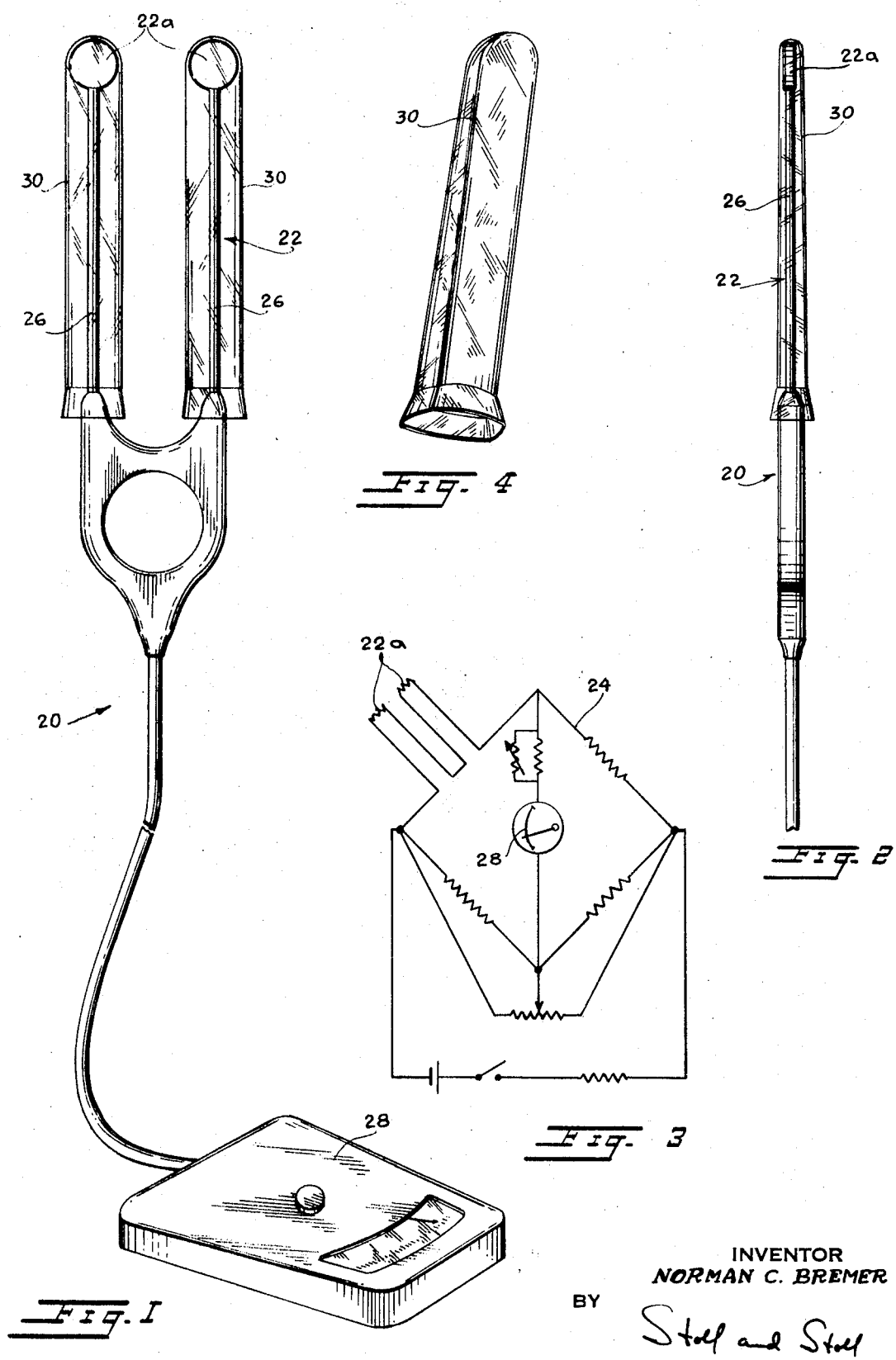
INVENTOR
NORMAN C. BREMER
BY Stoll and Stoll
ATTORNEYS

BIFURCATED THERMOMETER PROBE

REFERENCE TO RELATED APPLICATION

This application is related to my co-pending Patent application Ser. No. 130,666, filed Apr. 2, 1971, and entitled FAST-RESPONSE TWO-PHASE THERMOMETER.

BACKGROUND OF THE INVENTION

The invention relates to the field of clinical thermometers for both home and institutional use and to industrial thermometers having similar temperature measurement requirements.

There are several multiple probe thermometers known to the art as represented by the following U.S. patents known to the applicant:

| Number | Name | Date |
| --- | --- | --- |
| 1,589,294 | Fusca | June 15, 1926 |
| 1,648,939 | Evins | Nov. 15, 1927 |
| 1,935,784 | Smith | Nov. 21, 1933 |
| 2,321,846 | Obermaier | June 15, 1943 |
| 2,661,733 | Polsky | Dec. 8, 1953 |
| 2,753,714 | Perkins et al. | July 10, 1956 |
| 2,870,636 | Serafin | Jan. 27, 1959 |
| 3,095,743 | Teasel et al. | July 2, 1963 |
| 3,221,555 | Biber | Dec. 7, 1965 |
| 3,254,533 | Tongret | June 7, 1966 |
| 3,339,542 | Howell | Sept. 5, 1967 |
| 3,349,896 | Ensign et al. | Oct. 31, 1967 |
| 3,377,862 | Gheorghiu | Apr. 16, 1968 |

It will be seen from this art that multiple probe thermometers as heretofore known fall generally into two categories constituting either those in which two functionally separate thermometers providing two independent temperature measurements are physically mounted on a single support such as the Serafin patent referred to, or those in which a temperature differential between two locations is measured such as the Polsky patent referred to.

SUMMARY OF THE INVENTION

The invention comprises a single bifurcated thermometer probe in which the branches of the probe are joined to provide a single integrated reading which is an average of the individual temperatures sensed. In connection with a fluidic thermometer, the probe may constitute a single bifurcated bulb. In connection with electrical thermometers, the individual thermistors are connected in series as one branch of a balancing bridge.

It is an important feature of the invention, in connection with oral use, that the branches of the bifurcated probe are spaced so as to fit into the pockets on opposite sides of the fraenum of the tongue thereby securing the probe against lateral dislodgment, particularly when the mouth is open or the tongue is in motion. The particular and important advantages of this construction will be discussed hereinbelow.

BRIEF DESCRIPTION OF THE DRAWING

FIG. 1 is a front view of a remote reading electrical thermometer constructed in accordance with the principles hereof having a bifurcated probe with individual protective sleeves over each branch of the probe and a remote temperature-calibrated meter.

FIG. 2 is a side view of the bifurcated probe shown in FIG. 1. Also shown is a protective sleeve over one branch of the probe.

FIG. 3 is a schematic circuit diagram of an electrical thermometer constructed in accordance with the principles hereof.

FIG. 4 is a perspective view of one of the protective sleeves shown in FIGS. 1 and 2.

DESCRIPTION OF PREFERRED EMBODIMENTS OF THE INVENTION

The invention is of a single thermometer probe which has a plurality of branches. Each branch senses its ambient temperature and, because all branches are part of a single probe, all temperature measurements are integrated by the single probe and transferred as one temperature reading to a single temperature-calibrated readout device to provide a temperature reading which is the average of the individual ambient temperatures sensed.

In the preferred embodiment the probe is bifurcated, that is, it is provided with two branches having a particular spaced relation between them. The spacing for oral clinical thermometers corresponds to the spacing between the recesses on opposite sides of the fraenum of the tongue. In one embodiment the spacing is variable under spring pressure to automatically adjust while in the mouth to the particular dimensions of the subject's fraenum. In connection with industrial use, the spacing should correspond to the distance between the points as to which average temperature measurement is desired.

In the preferred embodiment, the branches of the probe are identical and the readings on the single calibrated scale are a true mathematical average of the temperatures sensed at a given time. It is within the scope of the invention, however, particularly in connection with industrial use, to provide branches which are not equal. Thus, one branch may have twice the temperature-sensing capacity of the other branch therefore rendering the temperature determination of the former dominant over a temperature determination of the latter with respect to the single reading. Such an embodiment would be useful, for example, in chemical processes wherein the subordinate branch of the probe would be used to determine the temperature at the center of a batch and the dominant probe could be placed at a likely hot spot to provide early warning of impending trouble. In this example, the distance between branches of the probe would be determined by the positions at which the measurements are to be made.

Referring now to FIGS. 1–4, the invention provides an electrical thermometer 20 having a single bifurcated probe 22, each branch 22a of which comprises a thermistor or other temperature-sensitive resistance element such as thin film resistors. The thermistors are wired in series as one branch of an adjustable bridge network 24. Temperature measurement is made by a single resistance meter 28 which is temperature-calibrated. The bridge is adjustable to provide zero or null point adjustment.

It will be seen that thermistors 22a are electrically combined to yield a single average temperature reading. If the thermistors are identical the reading is a mathematical average of the temperature sensed by each thermistor but, as noted above, it is within the scope of the invention to provide dissimilar branches of the probe for particular applications.

The primary use of the invention is for oral clinical use and the bifurcated probe, whether mechanical as in the first embodiment or electrical as in the second embodiment, provides extraordinary advantages over prior clinical thermometers. From the medical point of view it is known, for example, that the recesses on opposite sides of the fraenum of the tongue have different temperatures. While the differences are small, they may in certain cases be significant. Use of the bifurcated probe of the present invention provides an accurate average temperature reading which completely eliminates the error to which would result in obtaining only a conventional single temperature reading of one side of the fraenum.

From the practical point of view, the bifurcated probe of the present invention permits motion of the tongue without lateral dislodgment of the probe thereby permitting accurate temperature measurement of talkative children and other patients.

While the distance between probes should be particularly adapted to the intended use, it is entirely practical to have a variable spacing to continually adjust to varying conditions. For example, thermistors 22a can be mounted on spring-arms 26 to provide automatic adjustment to the varying fraenum contours from patient to patient. The spring action can be light so as not to exert undue or uncomfortable pressure on the fraenum.

Shown in FIGS. 1, 2, and 4 are protective sleeves 30 which are adapted to envelop the bifurcated probe. These sleeves may be single to encompass both branches of the probe or may be individual to cover each branch separately as shown in FIGS. 1, 2 and 4. The sleeves should be characterized by high thermal conductivity, sterility and economy for replacement.

While the foregoing is illustrative of embodiments of the invention, it is clear that other embodiments and modifications may be had within the teachings hereof. For example, the thermometer hereof may be used with a handy clipboard wherein the readout device and associated mechanics or circuitry are mounted on the clipboard and the bifurcated probe extends therefrom on a flexible tube or wire to permit rapid temperature measurement of patient after patient. The disposable sleeves would then be useful in achieving the necessary sterility.

What is claimed is:

1. A thermometer comprising:
   a. temperature-calibrated indicating means; and
   b. a branched temperature-sensing probe, said temperature-sensing probe being functionally connected to said temperature-calibrated indicating means,
   c. said branches of said probe each comprising a temperature-responsive resistance element wherein
   d. said elements are electrically connected in series as one arm of a bridge network,
   e. said temperature-calibrated indicating means being electrically connected across said bridge.

2. A thermometer in accordance with claim 1, wherein:
   said branched temperature-sensing probe is bifurcated.

3. A thermometer in accordance with claim 2, wherein:
   the branches of said bifurcated probe are spaced to correspond to the space between the recesses on opposite sides of the fraenum of the tongue.

4. A thermometer in accordance with claim 1, wherein:
   said resistance element is a thermistor.

5. A thermometer in accordance with claim 1, wherein:
   said resistance element is a thin film resistor.

* * * * *